United States Patent [19]
Ury et al.

[11] Patent Number: 4,833,683
[45] Date of Patent: May 23, 1989

[54] COHERENT COUPLING OF OPTICAL GAIN ELEMENTS

[75] Inventors: Israel Ury, Los Angeles; Amnon Yariv, San Marino, both of Calif.

[73] Assignee: Ortel Corporation, Alhambra, Calif.

[21] Appl. No.: 47,783

[22] Filed: May 8, 1987

[51] Int. Cl.[4] .......................... H01S 3/17; H01S 3/098
[52] U.S. Cl. ........................................ 372/41; 372/18; 372/21; 372/75; 372/94
[58] Field of Search ...................... 372/68, 94, 108, 98, 372/92, 39, 41, 18, 21, 75

[56] References Cited

U.S. PATENT DOCUMENTS

| | | | |
|---|---|---|---|
| 4,189,652 | 2/1980 | Levinos et al. | 372/98 |
| 4,520,484 | 5/1985 | Huignard et al. | 372/108 |
| 4,648,092 | 3/1987 | Ewbank et al. | 372/98 |

OTHER PUBLICATIONS

Shkunov and Zel'dovich, Optical Phase Conjugation, *Scientific American*, Dec., 1985, pp. 54-59.
Pepper, Applications of Optical Phase Conjugation, *Scientific American*, Jan. 1986, pp. 74-83.
Fischer, et al., Amplified Reflection, Transmission, and Self-Oscillation in Real-Time Holography, vol. 6, No. 11/*Optics Letters*, Nov. 1981, pp. 519 to 521.
Cronin-Golomb, Yariv and Ury, Coherent Coupling of Diode Lasers by Phase Conjugation, *App. Phys. Lett.* 48(19), 12 May 1986, American Institute of Physics, pp. 1240-1242.
Kwong and Yariv, One-Way, Real Time Wave Front Converters, *Appl. Phys. Lett.* 48(9), 3 Mar., 1986—American Institute of Physics, pp. 564-566.
Gronin-Golomb, Lau, and Yariv, Infrared Photorefractive Passive Phase Conjugation with BaTiO$_3$: Demonstrations with GaAlAs and 1.09-$\mu$m Ar$^+$ Lasers, *App. Phys. Lett.* 47(6), 15 Sep. 1985, American Institute of Physics, pp. 567-569.
Feinberg and Bacher, Phase-Locking Lasers with Phase Conjugation, Oct. 24, 1986 *App. Physics Letters*, 14 pages.

*Primary Examiner*—William L. Sikes
*Assistant Examiner*—Xuan Thi Vo
*Attorney, Agent, or Firm*—Christie, Parker & Hale

[57] ABSTRACT

Coherent coupling of a plurality of reflection type optical gain elements with a seeding laser is provided by illuminating the optical gain elements with fanned laser light scattered from a photorefractive medium. The reflection type optical gain elements have an anti-reflective end nearer the photorefractive medium and a reflective opposite end. The optical gain elements also illuminate the photorefractive medium. The resultant amplified and coherent light beam has its wavefront cleaned up with a photorefractive oscillator to provide a diffraction limited or nearly diffraction limited beam.

21 Claims, 1 Drawing Sheet

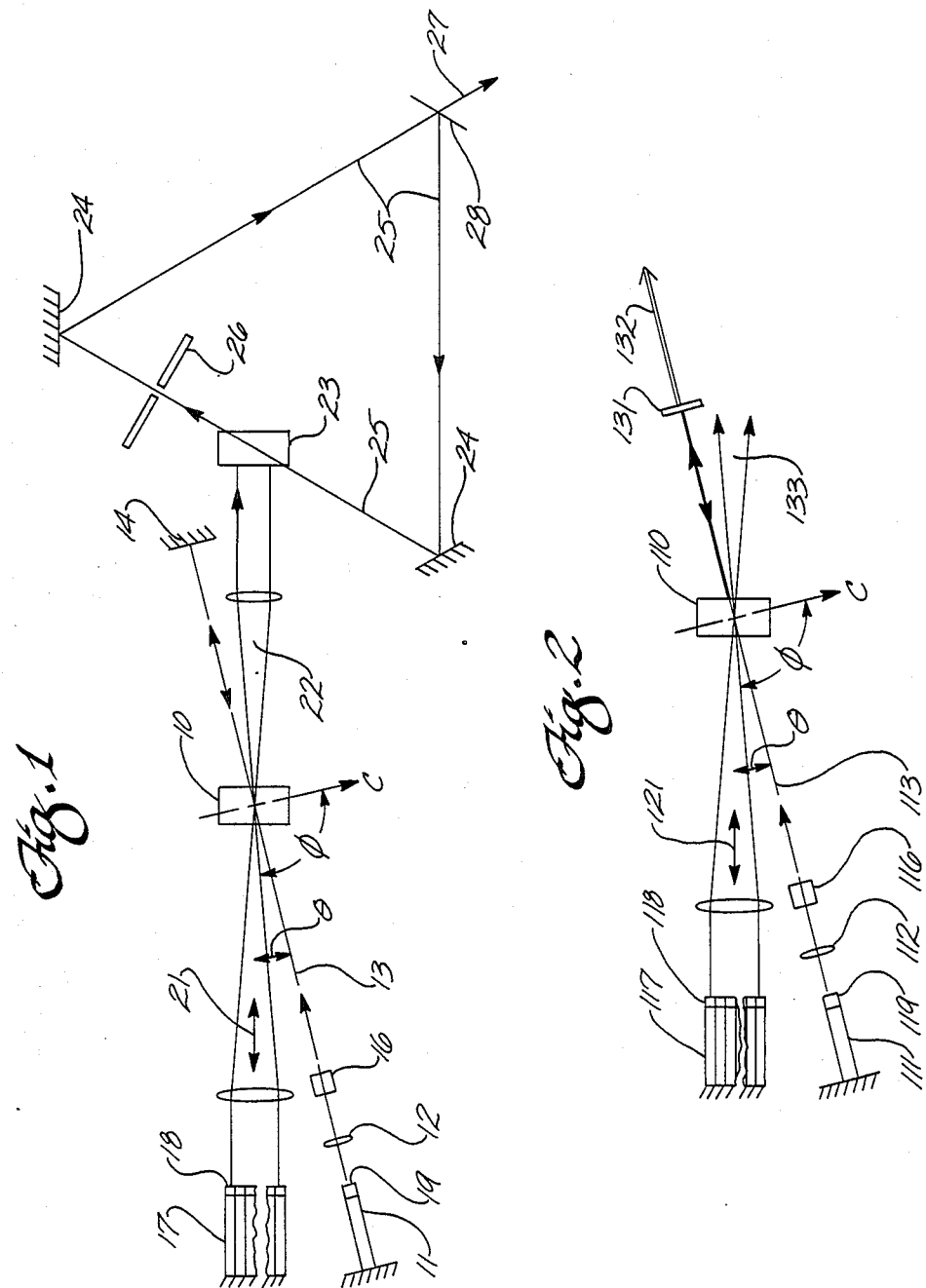

COHERENT COUPLING OF OPTICAL GAIN ELEMENTS

BACKGROUND

A variety of proposals and actual embodiments for optical communication, detection and ranging have been made. These include long range communications and relatively short distance transmission of information. It is important in most of these arrangements to have a high quality, i.e., nearly diffraction limited, high intensity, temporally coherent light beam. A laser can provide a high quality light beam, but may be limited in the power it can deliver to the beam.

For example, it is desirable to employ laser diodes for optical communication. These have low power consumption, can be rapidly switched, have very small physical dimensions, can be made economically, and produce a good quality light beam. The amount of power available from the laser diode, may be limited, however, by the possibility of damaging the laser at high power levels.

It is therefore desirable to combine the power of several lasers or optical gain elements, i.e., optical amplifiers, to enhance the power in a light beam. Individual laser diodes differ slightly from each other and may therefore lase at slightly different frequencies and are not temporally coherent. A technique is therefore desirable for providing optical coupling for several elements that provide optical gain for making the output beams of the optical gain elements temporally coherent.

BRIEF SUMMARY OF THE INVENTION

There is, therefore, provided in this practice of this invention according to a presently preferred embodiment, a coherent light source where the outputs of a plurality of optical gain elements are coupled by means of a non-linear photorefractive crystal. A laser is used for illuminating the crystal, with a mirror on the opposite side of the crystal from the laser aligned for reflecting light back toward the laser. A plurality of optical gain elements are aligned with the crystal, with a reflective surface at the end of the gain element further from the crystal. The gain elements are pumped to provide gain for light of a frequency similar to the principal lasing frequency of the laser. A portion of the reflected laser light is scattered toward the optical gain elements. These gain elements amplify the laser illumination and return it to the photorefractive crystal to produce a combined amplified output beam that is temporally coherent. Preferably, the wavefront of the output beam is improved with a photorefractive ring oscillator for making the output more nearly diffraction limited.

BRIEF DESCRIPTION OF THE DRAWINGS

These and other features and advantages of the present invention will be appreciated as the same becomes better understood by reference to the following detailed description when considered in connection with the accompanying drawings wherein:

FIG. 1 illustrates schematically a coherent light source constructed according to principles of this invention; and FIG. 2 is a schematic illustration of another embodiment of coherent light source.

DETAILED DESCRIPTION

The schematic drawings depict a number of optical elements and light beams with no attempt to represent the physical dimensions, angular relations or the like of the features illustrated. The dimensions and angles of an actual embodiment will be apparent to one skilled in the art in view of the following description.

Subject matter of this application is described in a paper entitled "Coherent Coupling of Diode Lasers By Phase Conjugation" by Mark Cronin-Golomb, Amnon Yariv and Israel Ury, Applied Physics Letters, 48, (May 12, 1986), 1240–1242. Reference is also made to "One Way, Real Time Wavefront Converters" by Sze-Keung Kwong and Amnon Yariv, Applied Physics Letters, 48, (Mar. 3, 1986), 564–566, and "Infrared photorefractive passive phase conjugation with $BaTiO_3$: demonstrations with GaAlAs and 1.09 m Ar+lasers" by Mark Cronin-Golomb, Kam Y. Lau and Amnon Yariv, Applied Physics Letters, 47, (Sept. 15, 1985), 567–569. The subject matter of these papers is hereby incorporated by reference.

An important element of the coherent light source is a photorefractive crystal 10. An exemplary crystal useful in practice of this invention is barium titanate ($BaTiO_3$) which has been poled by application of an electric field.

Optically non-linear photorefractive materials have an index of refraction that varies as a consequence of the interaction of light waves with the material. The varying index of refraction can produce what is, in effect, a three dimensional hologram within the material, and the time constant of changes in index of refraction can be fast enough that a dynamically responding hologram is produced. A number of non-linear effects on light beams may result because of such variations in index of refraction. This invention takes advantage of such photorefractive effects.

In the coherent light source of this invention a conventional semiconductor laser diode 11 is aligned for illuminating the photorefractive crystal 10. A lens 12 is illustrated schematically in the light beam 13 from the laser to the photorefractive crystal. The lens is merely symbolic of various optical elements such as lenses or mirrors which may be used in a conventional manner and do not form a part of this invention, even though used in its practice.

A mirror 14 is provided on the opposite side of the photorefractive crystal from the laser and aligned for retroreflecting light back toward the laser. A conventional optical isolator 16, such as one employing a Faraday rotator is positioned between the laser and the photorefractive crystal for limiting reflection of light back into the laser. This enhances the stability of the laser and the system as a whole.

A plurality of optical gain elements 17 have their optical axes aligned with the photorefractive crystal. The optical gain elements are preferably semi-conductor diodes made of a material similar to the laser so that their characteristic frequency of stimulated emission of radiation is close to that of the laser. Preferably, the end of each gain element nearer the photorefractive crystal has a conventional anti-reflective coating 18, and the opposite end, further from the photorefractive crystal, is reflective. The anti-reflective coating minimizes internal oscillation within the optical gain medium and effectively prevents the elements from being lasers per se.

Even if the ends 18 are not perfectly anti-reflective, the system still works.

Preferably, the optical gain elements employed in practice of this invention are what can be called reflection type gain elements. These have a high reflectivity at the rear facet and a very low reflectivity at the front facet. This, of course, differs from a laser in that a laser requires finite reflectivity at both the front and back facets. Further, a conventional transmission laser amplifier has a low reflectivity at both ends. In the reflection type gain element the front facet reflectivity is low enough to prevent the optical gain element from lasing on its own.

Many types of conventional lasers and optical gain devices may be used in practice of this invention. Broad area lasers may be used, or arrays of lasers may be used. The gain devices may employ semi-conductors, doped glasses, active gaseous media or the like to provide optical gain. An exemplary optical gain element is fabricated in the same manner as a buried heterostructure window laser. In such a structure an active layer of GaAlAs, or the like, of minute dimensions is buried in a body of similar inactive material which isolates the active layer and permits application of a pumping electric field thereto. The active layer may have a width in the order of 1 micron, a thickness of 0.1 micron and be a few hundred microns long. A plurality of such optical gain elements can be fabricated side-by-side on a single semiconductor wafer. This facilitates alignment, assures similarity of the several optical gain elements, and facilitates making electrical connections for the pumping electric field.

If desired, a semiconductor laser 11 can be fabricated on the same wafer as the optical gain elements. If desired, addition of a semi-reflective coating 19 on the end of the laser nearer the photorefractive crystal may enhance lasing when the gain medium of the laser is pumped.

When the photorefractive crystal is illuminated by the laser, a portion of the laser light is scattered into a broad fan of light. This is due to the formation of tiny "fanning gratings" between the laser light and the scattered light from the inherent imperfections of the photorefractive crystal. The portion of laser light transmitted through the crystal is retroreflected by the mirror 14 and scatters off the fanning gratings toward the optical gain elements. When this light enters the optical gain elements, it stimulates emission of radiation coherent with the incident illumination. In effect, the optical gain elements become two-pass lasing cavities. The resultant amplified light beam 21 from the optical gain elements is redirected toward and through the photorefractive crystal as an output beam 22. Some light from the optical gain elements is retroreflected from the photorefractive crystal and mirror 14 as a phase conjugated beam for additional amplification by the gain elements, thereby enhancing the light output of the coherent light source.

In this arrangement, the light from the laser and retroreflecting mirror is aligned at an angle theta from the axis of the light beam 21 to provide phase conjugated fanning light for initial injection locking of the optical gain elements. It is required that the positive C axis of the poled barium titanate crystal or other photorefractive medium be aligned at an angle phi from the axis of the optical gain element light beam 21.

It is believed to be essential that illumination from the laser be scattered to the gain elements to initiate coherent seeding and stimulated emission of temporally coherent radiation. In the embodiment described and illustrated, the angle theta between the light beam from the laser and the optical gain elements should be less than ten degrees and preferably about 5 degrees. It is desirable to have a small angle between the beams to increase overlap of the beams. However, a small angle results in a large grating period and reduces coupling efficiency. The optimum angle is about five degrees. The angle phi between the light beam 21 from the optical gain elements and the positive C axis of the barium titanate crystal should be in the range of from 100 to 170 degrees and preferably about 135 degrees. These parameters are appropriate for assuring coherent coupling and amplification of a strong output beam with a barium titanate crystal. Variations in these angles may be appropriate with other photorefractive media.

The number of optical gain elements employed is a function o the output power desired and the power level achievable by the individual gain elements. Of the retroreflected light scattered to the gain elements approximately 1/n is directed to each element where n is the each element is number of elements. The light from, combined so that the light output is n(1/n)G, where G is the net gain of each element. Thus, there is obtained a coherent amplifier where the power output is subdivided among a number of optical gain elements so that the power level in each element is not excessive.

When the beams of light from the several optical gain elements are phase locked to the master laser 11, they do not constitute a single diffraction limited beam. Improvement of the wavefront quality of the output beam 22 is therefore desirable to make it more nearly diffraction limited. One means for wavefront clean-up is illustrated toward the right side of FIG. 1.

In this embodiment a photorefractive crystal 23 of a unidirectional ring oscillator is illuminated by the output beam 22 of the coherent light source. A pair of mirrors 24 are arranged for reflecting light from the photorefractive crystal 23 around a loop 25. Higher order modes of oscillation of the ring oscillator are suppressed by placing a spatial filter 26 in the ring cavity and a single steady mode results. An output beam 27, which may be nearly diffraction limited, is obtained via a beam splitter 28. An improvement of wavefront quality or increase in brightness of more than 4000:1 can be achieved. Other unidirectional oscillators suitable for beam clean-up are described in the aforementioned paper by Kwong and Yariv.

It will be observed that coherent coupling of the optical gain elements and the laser may not occur instantaneously. The photorefractive time constant of barium titanate is relatively large and a moderate interval elapses before full coherence develops with maximum amplification and diffraction limiting of the output beam.

FIG. 2 illustrates schematically another embodiment of coherent coupling to provide an amplified output beam. The reference numerals employed in referring to the features of this embodiment are the same as the reference numerals for similar features in the embodiment illustrated in FIG. 1, plus 100. For example, the master laser in FIG. 1 is designated by the numeral 11 and the corresponding laser in FIG. 2 is identified by the reference numeral 111.

In this embodiment the laser 111 illuminates a photorefractive crystal 110. A semi-transparent mirror 131 is aligned with the laser 111 and an amplified power output beam 132 passes this output mirror. In addition, an output beam 133 from the plurality of optical gain elements 117 exits and is not necessarily used further in practice of this invention. Some of the light illuminating the semi reflective mirror 131 is retrodirected to the optical gain elements and in effect forms one end-mirror of a lasing cavity with each such optical gain element. As a result, the light is amplified and a coherent amplified output light beam 132 is obtained.

In the embodiments hereinabove described and illustrated, the optical gain elements are in a one dimensional or plane array. It will be apparent that a two dimensional array maybe employed by stacking optical gain elements. Also, the synchronizing laser has been illustrated as if positioned to one side of the array of optical gain elements. If desired, it can be arranged amid an array of optical gain elements.

In the illustrated embodiment the optical gain elements have a reflective surface remote from the photorefractive crystal and an anti-reflective coating on the end nearer the photorefractive crystal. Since there is little reflection within the gain medium, there is little likelihood of spontaneous lasing. If desired, the optical gain elements may have a semi-reflective front facet to act as lasers. These are somewhat harder to make temporally coherent since the individual lasers have their own characteristic modes of oscillation frequency and coherent coupling is resisted. It is believed initiation of coherence may be promoted by starting the seeding laser first, followed by successive optical gain elements, which may then commence oscillation in coherence with the scattered light injected therein by the photorefractive crystal.

Many other modifications and variations will be apparent to one skilled in the art and it is therefore to be understood that within the scope of the appended claims, this invention may be practiced otherwise than as specifically described.

What is claimed is:

1. A coherent light source comprising:
   a non-linear photorefractive medium;
   a laser for illuminating the photorefractive medium;
   a mirror on the opposite side of the photorefractive medium from the laser and aligned for retroreflecting light back toward the laser; and
   a plurality of optical gain elements, each optical gain element having its optical axis aligned with the photo-refractive medium, each optical gain element having a reflective end remote from the photorefractive medium, the laser and optical gain elements being sufficiently aligned that laser light scattered from the photrefractive medium illuminates all of the optical gain elements for amplification and producing a coherent output beam.

2. A coherent light source as recited in claim 1 further comprising means aligned with the output beam of the optical gain elements for improving the wavefront quality of the output beam.

3. A coherent light source as recited in claim 2 wherein the means for improving the wavefront quality comprises a unidirectional ring oscillator.

4. A coherent light source as recited in claim 2 wherein the means for improving the wavefront quality comprises a photorefractive optical resonator.

5.. A coherent light source as recited in claim 1 wherein each optical gain element has an anti-reflective coating on the end nearer the photorefractive crystal.

6. A coherent light source as recited in claim 1, wherein the angle between the laser light beam and the axis of the optical gain elements is less than ten degrees.

7. A coherent light source as recited in claim 6, wherein the photorefractive medium comprises a barium titanate crystal and the angle between the positive C axis of the crystal and the axis of the optical gain elements is in the range of from 100 to 170 degrees.

8. A coherent light source as recited in claim 1 wherein the angle between the laser light beam and the axis of the optical gain elements is about five degrees.

9. A coherent light source as recited in claim 1 wherein the mirror is semi-reflective for passing an output beam from the light source.

10. A coherent light source comprising:
    a non-linear photorefractive crystal;
    a laser for illuminating the photorefractive crystal and scattering phase conjugated laser light;
    a mirror on the opposite side of the photorefractive crystal from the laser and aligned for retroreflecting light back toward the laser; and
    a plurality of optical gain elements, each optical gain element having its optical axis aligned with the photorefractive crystal, each optical gain element having a reflective end remote from the photorefractive crystal, and anti-reflective end nearer the photorefractive crystal and a pumpable optical gain medium therebetween, the laser and optical gain elements being sufficiently aligned that phase conjugated laser light scattered from the photorefractive crystal illuminates the optical gain elements and produces an output beam from each optical gain element coherent with the phase conjugated laser light; and
    means in the output beams of the optical gain elements for combining the output beams into a single, more nearly diffraction limited, output beam.

11. A coherent light source as recited in claim 10 wherein the means for combining comprises a unidirectional ring oscillator.

12. A coherent light source as recited in claim 10 wherein the means for combining comprises a photorefractive optical resonator.

13. A coherent light source as recited in claim 10, wherein the angle between the laser light beam and the axis of the optical gain elements is less than ten degrees.

14. A coherent light source as recited in claim 13, wherein the photorefractive crystal comprises a barium titanate crystal and the angle between the positive C axis of the crystal and the axis of the optical gain elements is in the range of from 100 to 170 degrees.

15. A coherent light source as recited in claim 10, wherein the angle between the laser light beam and the axis of the optical gain elements is less than five degrees.

16. A coherent light source compromising:
    a photorefractive crystal for producing phase conjugated light when illuminated with coherent light;
    a plurality of optical gain elements, each optical gain element comprising a pumpable gain medium, a reflective face at one end of the gain medium, and an anti-reflective face at the other end of the gain medium for amplifying and retrodirecting light toward the photorefractive crystal;
    means for illuminating the anti-reflective end of all of the optical gain elements with the phase conjugated light from the photorefractive crystal;
    a laser for illuminating the photorefractive crystal with coherent light for mixing the laser light in the photorefractive crystal with the light retrodirected from all of the optical gain elements; and means for receiving the mixed laser light and retrodirected light from the photorefractive crystal and improving the wavefront quality of the mixed light.

17. A coherent light source as recited in claim 16 wherein the means for improving the wavefront quality comprises a unidirectional ring oscillator.

18. A coherent light source as recited in claim 16 comprising a mirror for reflecting laser light back into the photorefractive crystal at an appropriate angle for illuminating the anti-reflective end of the gain elements.

19. A coherent light source as recited in claim 16, wherein the angle between the laser light beam and the axis of the optical gain elements is less than ten degrees.

20. A coherent light source as recited in claim 19, wherein the photorefractive crystal comprises a barium titanate crystal and the angle between the positive C axis of the crystal and the axis of the optical gain elements is in the range of from 100 to 170 degrees.

21. A coherent light source as recited in claim 10, wherein the angle between the laser light beam and the axis of the optical gain elements is less than five degrees.

* * * * *